(12) United States Patent
Huffer et al.

(10) Patent No.: US 6,517,243 B2
(45) Date of Patent: Feb. 11, 2003

(54) BAG WITH REUSABLE BUILT-IN CLOSURE TAB

(75) Inventors: Scott W. Huffer, Hartsville, SC (US); Jeffrey M. Schuetz, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/784,890

(22) Filed: Feb. 16, 2001

(65) Prior Publication Data

US 2002/0114541 A1 Aug. 22, 2002

(51) Int. Cl.[7] ................................................ B65D 33/20
(52) U.S. Cl. ............................ 383/88; 383/62; 383/77; 383/116; 383/203
(58) Field of Search ..................... 383/203, 62, 77, 383/88, 89, 111, 116, 211

(56) References Cited

U.S. PATENT DOCUMENTS

| | | |
|---|---|---|
| 241,795 A | 5/1881 | Edson |
| 1,128,192 A | 2/1915 | Smith |
| 1,133,911 A | 3/1915 | Barnard |
| 1,164,688 A * | 12/1915 | Whritenour ............... 383/62 |
| 1,619,887 A | 3/1927 | Sapp |
| 3,217,934 A | 11/1965 | Schneider et al. |
| 3,224,640 A | 12/1965 | Schneider et al. |
| 3,554,436 A | 1/1971 | Palmer |
| 3,608,707 A | 9/1971 | Miller |
| 3,613,874 A * | 10/1971 | Miller ..................... 383/203 X |
| 3,618,850 A | 11/1971 | Palmer |
| 3,655,118 A | 4/1972 | Rinecker |
| 3,747,776 A | 7/1973 | Gross |
| 3,806,024 A * | 4/1974 | Marchesani ................ 383/62 |
| 3,925,585 A | 12/1975 | Aoyagi |
| 4,260,061 A * | 4/1981 | Jacobs ..................... 383/203 |
| 4,273,816 A | 6/1981 | Tollette |
| 4,345,393 A | 8/1982 | Price et al. |
| 4,398,985 A | 8/1983 | Eagon |
| 4,513,445 A | 4/1985 | Kamp |
| 4,581,007 A | 4/1986 | Kamp |

(List continued on next page.)

FOREIGN PATENT DOCUMENTS

| | | |
|---|---|---|
| CH | 9972/62 | 5/1996 |
| EP | 0 517 566 A1 | 5/1992 |

*Primary Examiner*—Jes F. Pascua
(74) *Attorney, Agent, or Firm*—Drinker Biddle & Reath LLP

(57) ABSTRACT

A bag having a built-in closure tab is defined. The closure tab is formed from the outer layer of the laminate which makes up the bag. When a user of the bag wishes to close the bag, the user folds or rolls the sides of the bag together down the side of the bag having the tab. The tab is partially separated from the rest of the outer layer of the laminate. A pressure sensitive adhesive disposed on the interior surface of the tab is used to affix the tab to the rolled down portion of the bag, preventing unwanted opening of the bag. The tab may be affixed and removed from the rolled down portion a number of times, thereby allowing the user to open and reseal the bag as many times as desired.

22 Claims, 3 Drawing Sheets

U.S. PATENT DOCUMENTS

| | | | |
|---|---|---|---|
| 4,584,201 A | 4/1986 | Boston | |
| 4,603,537 A | 8/1986 | Pace | |
| 4,622,799 A | 11/1986 | Boston | |
| 4,767,654 A | 8/1988 | Riggsbee | |
| 4,771,891 A | * 9/1988 | Sorensen et al. | 206/459.5 |
| 4,810,103 A | 3/1989 | Bell | |
| 4,863,287 A | 9/1989 | Marsik | |
| 4,871,265 A | 10/1989 | Peck | |
| 4,889,234 A | * 12/1989 | Sorensen et al. | 206/459.5 |
| 4,902,141 A | 2/1990 | Linnewiel | |
| 4,911,563 A | 3/1990 | Ciani | |
| 4,993,845 A | * 2/1991 | Faltynek | 383/111 X |
| 5,044,776 A | 9/1991 | Schramer et al. | |
| 5,078,509 A | 1/1992 | Center et al. | |
| 5,174,659 A | 12/1992 | Laske | |
| 5,264,265 A | 11/1993 | Kaufmann | |
| 5,511,883 A | 4/1996 | Clark et al. | |
| 5,524,759 A | 6/1996 | Herzberg et al. | |
| 5,582,889 A | 12/1996 | Pedrini | |
| 5,606,846 A | 3/1997 | Raby et al. | |
| 5,772,331 A | 6/1998 | Irace et al. | |
| 5,824,380 A | 10/1998 | Hagen | |
| 5,855,434 A | 1/1999 | Hagen | |
| 5,945,145 A | 8/1999 | Narsutis et al. | |

* cited by examiner

BAG WITH REUSABLE BUILT-IN CLOSURE TAB

FIELD OF THE INVENTION

The present invention relates to a bag for containing items, such as consumables. More particularly, the invention is directed to a bag having a built-in closure tab.

BACKGROUND OF THE INVENTION

Bags, such as film bags, are utilized extensively in modern society for containing a wide variety of items, such as candies, food items and liquids. A typical film bag is made from a laminate that includes an outer film layer adhesively secured to an inner sealing layer. The outer layer is usually made from a material that facilitates printing. The inner layer is usually made from a material that enables the package to be sealed. Other layers can also be incorporated. Properties, such as permeability to oxygen and moisture, strength, stiffness and other packaging requirements may dictate material selection. The outer and inner layers are both typically made from plastic film, such as polyethylene or polypropylene.

The conventional bag is closed by bringing two opposing sides into contact and downwardly folding or rolling them together. When closed, the bag may tend to free itself from the rolled configuration, thereby reopening and exposing its contents to ambient air. Various methods of preventing the conventional bag from reopening have been attempted. Household items such as clothes pins or paper clips have been used to hold the conventional bag closed. Articles of manufacture, such as the Chip-Clip® (a registered trademark of the Chip Clip Company of Dallas, Tex.), have been specially designed as closures for bags.

Other attempts to provide a closure mechanism for a conventional bag have tried to provide a closure device with the bag itself. Some bags have been provided with a metal wire or strip along the length of the bag, the wire or strip being easily bent under the user's manipulation, but resisting the tendency of the bag to open once folded, thus keeping the bag closed. An example of such a bag is disclosed by U.S. Pat. No. 3,618,850 to Palmer. Other bags are provided with nonresiliently flexible strips disposed transversely to the length of the bag. The nonresilient strip is along the top of the bag and extends beyond the side of the bag. Once the top of the bag is rolled down a first side, the extending portion of the strip is folded snugly against a second side, opposite the first side, preventing the bag from unrolling.

Still other attempts to seal a bag involve retrofitting a tab or label onto the bag. A first portion of the label is attached to a bottom portion of the bag with a permanent adhesive. The label has a second portion on which a releasable adhesive is disposed. When the bag is closed and folded downwardly, the portion with releasable adhesive may be attached to the folded portion, thereby preventing the bag from unrolling. One example of a bag of this type is disclosed by U.S. Pat. No. 5,582,889 to Pedrini. One problem with a retrofitted closure tab is the expense of manufacturing and handling the tab.

It is desirable to provide a bag having a closure device which is not as complex or expensive to produce as those described above.

SUMMARY OF THE INVENTION

The invention is directed to a bag with a reusable built-in closure tab. The closure tab is formed from the outer layer of the laminate which forms the sides of the bag. Thus, the closure tab is "built-in."

A bag according to the present invention has an inner and an outer layer. A portion of the outer layer is defined as a tab. The tab portion is separated from the remainder of the outer layer (the fixed portion) by precision cutting. After cutting, the tab portion remains attached to the fixed portion only at its base. A pressure sensitive adhesive, rather than a permanent adhesive, is disposed on the under side of the tab portion, attaching the tab to the inner layer. Thus, the tab portion may be easily pulled away from the inner layer, although remaining attached at its base. The pressure sensitive adhesive disposed on the inside of the tab may be used to affix the tab to a rolled down portion of the bag, thereby sealing the bag closed.

BRIEF DESCRIPTION OF THE DRAWINGS

For the purpose of illustrating the invention, there is shown in the drawings a form which is presently preferred; it being understood, that this invention is not limited to the precise arrangements and instrumentalities shown.

DETAILED DESCRIPTION OF THE INVENTION

With reference to the drawings, wherein like numerals identify like elements, there is shown a film bag generally identified by the numeral 10. Positioned on a wall of the package 10 is a closure tab 20. The film bag according to the present invention is operative for containing articles, such as candies, food and other items.

Figure 1:
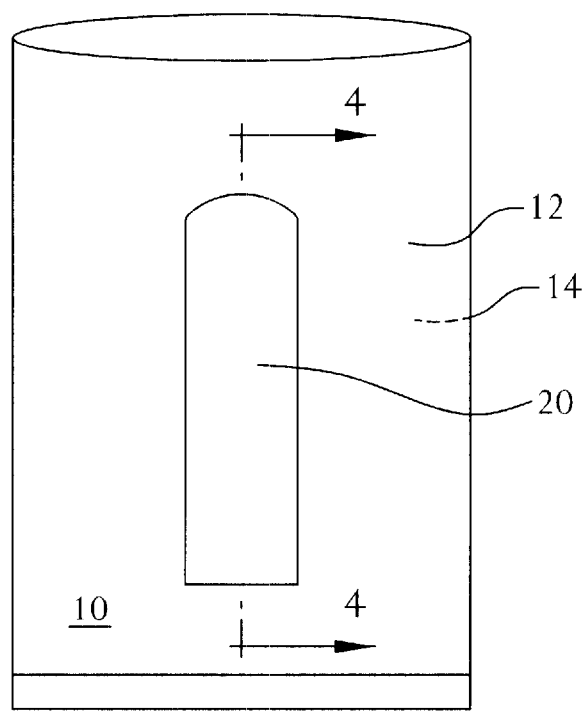
FIG. 1 is a perspective view of an open bag according to the present invention.
Figure 2:
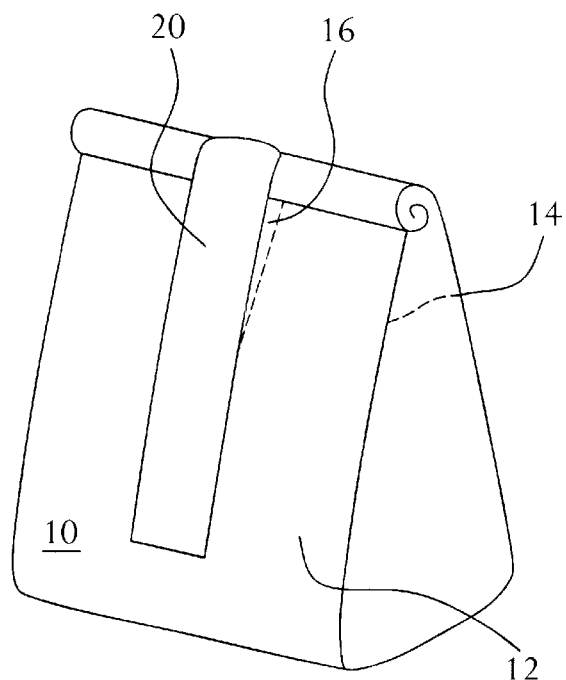
FIG. 2 is a perspective view of a closed bag according to the present invention.
Figure 3:
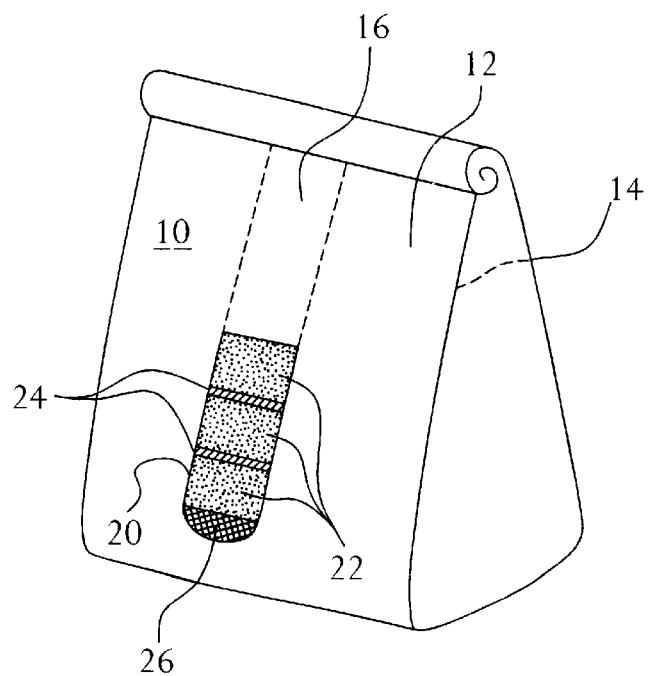
FIG. 3 is a perspective view of a bag according to the present invention, a built in closure tab being oriented to reveal its under side.

As seen in FIGS. 1 through 3, Bag 10 has a front wall 12 and a back wall 14. The walls of the bag, and thus, the bag itself are formed from a laminate having at least two layers, the laminate being described in greater detail below. Tab 20 is provided on front wall 12. In fact, tab 20 is formed from an outer layer 34 of the laminate, as seen in FIG. 4.

In practice, the tab 20 should be substantially coplanar with the remainder of the front bag wall 12 before the bag is opened. Once the user opens the bag and consumes a portion of the contents stored therein, the user brings both sides of the bag together to re-close the top of the bag. The user pulls at least part of the tab 20 away from the plane of the wall 12. The top of the bag is then rolled or folded down, the roll forming along front wall 12. The user then engages the tab 20 with the rolled portion, the tab 20 adhering to the folded portion with great enough affinity to prevent the bag from unrolling.

Figure 4:
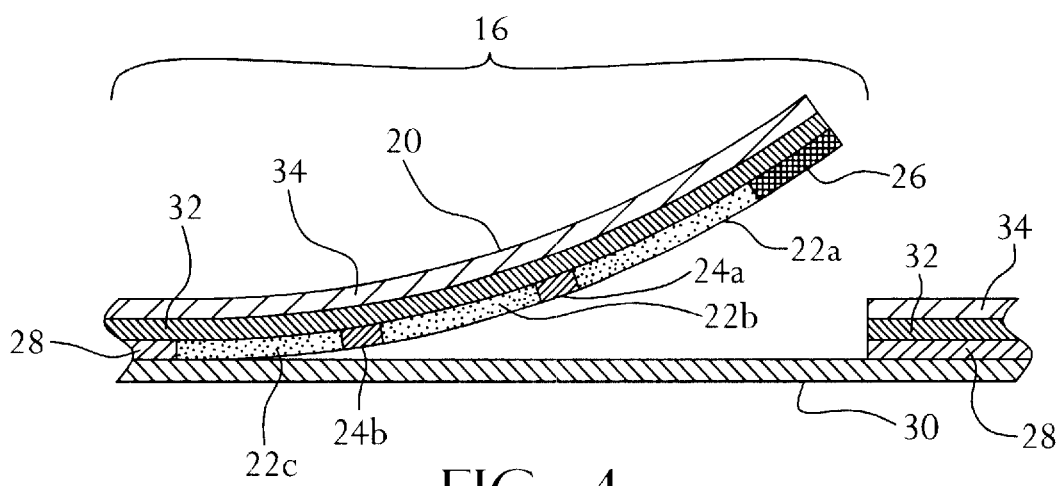
FIG. 4 is a cross sectional view of a portion of the side of a bag according to the present invention, taken along line 4—4 in FIG. 1.

FIG. 4 shows a schematic cross section of a portion of the front wall 12, taken along line 4—4 of FIG. 1. The laminate forming bag 10 comprises an inner layer 30 and an outer layer 34. The laminate forming bag 10 may comprise various additional layers as may be desired for the packaging of numerous different products. Properties, such as permeability to oxygen and moisture, strength, stiffness and other desired qualities may dictate material selection.

The outer layer 34 is preferably formed from oriented polypropylene (OPP) or polyester, specifically polyethylene terephthalate (PET), it being understood that many other polymers, copolymers, and combinations thereof are also suitable. The outer layer 34 is preferably about 1 mil thick, a mil being understood to be 1/1000 of an inch. It being frequently desirable to have a bag with color, designs, graphics and other indicia, the outer layer 34 may be reverse printed, as represented by an ink layer 32.

The inner layer 30 is preferably polyethylene. Alternately, inner layer 30 may be formed from any compositions or multi-layer laminates which may be permanently sealed, preferably by heat sealing. The inner layer 30 is substantially uniform across the entire bag, there being no holes, cut outs or regions substantially different than the rest.

The outer layer 34 is bonded to the inner layer 30 by a permanent adhesive 28. While the permanent adhesive 28 is applied, a knock-out zone 16 is provided during manufacture of the bag 10. The knock-out zone 16 may be mechanically covered when permanent adhesive 28 is applied. More preferably, the laminate may be manufactured, and the knock out zone may be created, using a rotogravure printing process, as discussed below. No permanent adhesive 28 should be applied within the knock-out zone 16.

Thus, the outer layer 34 may be considered to have two portions, the fixed portion and the tab 20. The fixed portion of outer layer 34 is permanently adhered to inner layer 30. The area of the outer layer 34 corresponding with knock-out zone 16 forms tab 20 once manufacture of the bag 10 is complete. The knock-out zone 16 should extend to near enough the bottom of the bag 10 as to be capable of releasing the closure tab 20 for effective closure of bag 10, even when the bag 10 is very nearly empty.

The permanent adhesive 28 may be any known adhesive which provides adequate affinity between the outer and inner layers. It is preferable that the permanent adhesive 28 be a conventional solvent or water based adhesive that is dried by evaporation within an oven. It is understood, however, that other adhesives such as energy curable adhesives could also be used. Other acrylic and urethane adhesives, including solventless, are known to be suitable.

The tab 20 may be formed by precision die cutting or laser scoring the outer layer 34. Any process capable of accurately cutting the outer layer 34 while leaving the inner layer 30 in tact may be employed for forming the tab. Suitable laser scoring equipment may be obtained from Laser Machining, Inc. of Somerset, Wis. Laser scoring uses a focused spot of energy to remove material to a specified depth, allowing the unscored portion, here the inner layer 30, of the laminate to retain package strength and barrier properties. Precision die cutting may also be used, and for purposes of economy, may be preferred.

As seen in the drawings, tab 20 is never fully removed from the fixed portion of outer layer 34. Rather, tab 20 remains tangentially attached to the remainder of outer layer 34 along an adequate line or region such that danger of accidental total separation, such as by ripping, is minimized. As noted above, it is preferable that the tangential attachment be near the bottom of the bag 10.

Within the knock out zone 16, where permanent adhesive is not dominant, a pressure sensitive adhesive (PSA) 22 is provided. The particular PSA selected for use in the invention may vary depending on the substance chosen for outer layer 34. Those skilled in the art would readily be capable of selecting a suitable PSA 22 in light of the teachings provided herein. The PSA should, however, have a greater affinity for the interior surface of outer layer 34 than for the inner layer 30 and the exterior surface of outer layer 34. Conventional preparation techniques for increasing affinity of the ink 32 and PSA 22 to the interior surface of outer layer 34, such as flame and corona discharge treatment, are well known. A release layer may also be applied to the exterior surface of outer layer 34 to prevent PSA 22 from adhering to the exterior surface thereof when tab 20 is affixed and removed from the roll of the bag 10.

It is preferable to use an adhesive which is pressure sensitive such that the closure tab 20 may be applied and removed a plurality of times from engagement with inner layer 30 and with the fold of bag 10, as shown in FIG. 2.

In one embodiment of the invention, the pressure sensitive adhesive is a water-based acrylic adhesive, such as Nacor® 72-8761 adhesive, sold by National Starch and Chemical Company, Bridgewater, N.J. The pressure sensitive adhesive 32 is preferably applied to the removable tab portion 20 with a thickness of about 0.07 to 0.25 mils.

In one embodiment, PSA 22 is provided in zones, shown as 22a through 22c in FIG. 4. When the PSA 22 on the tab 20 is provided in zones, only one zone need be used at a time, keeping the remaining zones free of dust or other potential contaminants. Once the PSA on the zone in use has reached the end of its useful life, the user may expose the next zone for use. Separating each zone is a gutter of a stronger adhesive 24, shown as elements 24a and 24b in FIG. 4. For purposes herein, a "stronger adhesive" is intended to mean any adhesive with a greater affinity to inner layer 30 than the affinity of PSA 22 to inner layer 30. As such, stronger adhesive 24 may be another PSA or may be a heat curable adhesive. However, for reasons that will become clear below, stronger adhesive 24 should not be so strongly adhered to inner layer 30 as to be inseparable therefrom without causing damage to tab 20 or inner layer 30.

It is preferred to provide an adhesive-free zone 26 at the tip of the tab 20. The adhesive-free zone 26 may be provided to assist the user in grasping the tab 20 for separation thereof from inner layer 30.

When the PSA 22 is provided in zones, as shown in FIGS. 3 and 4, a user may grasp the tip of tab 20 and pull with an adequate force to separate PSA zone 22a from inner layer 30. The force initially used should not be so great as to separate stronger adhesive 24a from inner layer 30. Thus, the user may initially reveal only zone 22a, keeping zones 22b and 22c protected from contamination. With zone 22a revealed, the user may roll down the bag 10, such as one might normally do to close a bag, and affix zone 22a to the rolled portion to ensure the bag remains closed. FIG. 2 shows the tab 20 affixed to the rolled portion.

In the event PSA 22a loses its affinity and fails to properly keep the bag closed or if it is desired to roll the bag down beyond where tab 20 remains affixed to inner layer 30, the user may reveal an additional PSA zone 22b. The user may do so by pulling tab 20 away from inner layer 30 with adequate force to separate a first stronger adhesive gutter therefrom, identified by the numeral 24a in the drawings. The separation of stronger adhesive 24a from inner layer 30 reveals PSA zone 22b. Tab 20 may then be affixed to the folded portion of the bag 10 via PSA 22b, in a way similar to that shown in FIG. 2.

Additional PSA zones 22 may be sequentially revealed as needed. It is preferable that the last PSA zone 22 be near the bottom of the bag such that it is capable of holding the bag 10 closed when the bag 10 is very nearly empty and the user rolls or folds the bag 10 downwardly to very near its bottom.

It is currently contemplated that three zones of PSA 22, as shown in the drawings, are adequate for the design of most bags. However, more zones may be desirable for very large bags or bags which a user must open and reseal an excessive number of times before completely consuming products contained therein.

Figure 5:
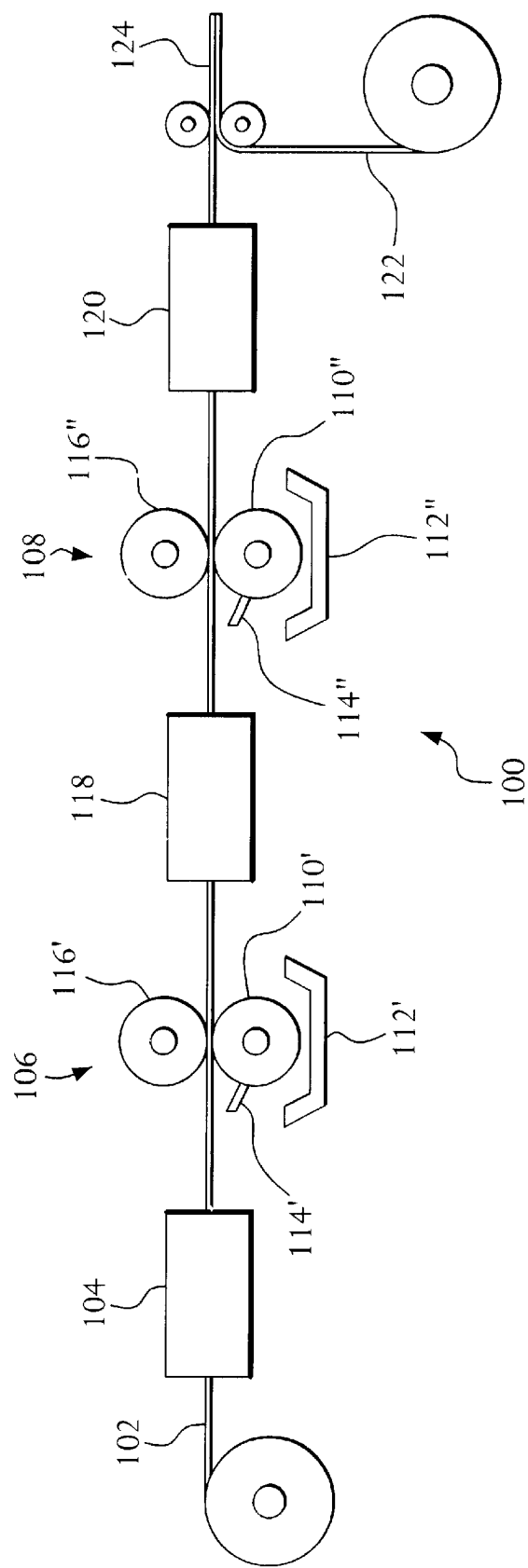
FIG. 5 is a schematic diagram of one preferred method of forming the film bag laminate according to the present invention.

The bag laminate according to the present invention is preferably made in a single forming process 100 as shown in FIG. 5 and discussed hereinafter.

The outer layer of material 102 is fed through a series of printing stations 104 wherein one or more layers of printed ink are applied to the outer layer in any conventional manner known to those skilled in the art.

The outer layer 102 with the printing formed thereon is then fed through first and second adhesive application stations 106, 108. Each adhesive application station includes a rotogravure laminating cylinder 1 10 that has a copper or similar surface which is capable of being engraved, a pan 112 for applying a suitable liquid to the cylinder 110, and a doctor blade 114 for removing liquid from the non-engraved portions of the cylinder 1 10. Rotogravure printing processes are well known to those skilled in the art, and are discussed in *Package Printing*, by Nelson R. Eldred, Ph. D, Jemlar Publishing Co., Inc, Plainview, N.Y., pages 86–88 (1993).

In a preferred embodiment of the present invention, in the first adhesive application station 106, the surface of a first rotogravure cylinder 110' is engraved so as to deliver the appropriate amount and pattern of pressure sensitive adhesive. The first rotogravure cylinder 110' rotates within a pan of pressure sensitive adhesive 112'. As the outer layer 102 passes the cylinder 110', the pressure sensitive adhesive is applied to the layer with a suitable amount of pressure from a roller 116' to force the adhesive to transfer to the outer layer 102. The non-engraved portion of the first rotogravure cylinder 110' produces a space within the pressure sensitive adhesive layer.

The outer layer 102 and pressure sensitive adhesive combination is fed through a dryer 118 to dry the adhesive and then into the second adhesive application station 108. In the second adhesive application station 108, the surface of a second rotogravure cylinder 110" is engraved so as to provide a mirror image of the permanent adhesive portion of the film bag laminate. The second rotogravure cylinder 110" rotates within a pan 112" of permanent adhesive. As the outer layer 102 passes the second rotogravure cylinder 110", the permanent adhesive is applied to the outer layer 102 in register with the space left in the pressure sensitive adhesive portion. The outer layer 102 is then fed through a dryer 120 to dry the adhesive.

If it is desired to provide the pressure sensitive adhesive in zones as described herein, an additional adhesive application station (not shown) must be provided. The additional application station applies the stronger adhesive, described above, to gutter zones left in the area where pressure sensitive adhesive is otherwise applied by application station 106. Those skilled in the art would readily be capable of designing the additional application station in light of the teachings provided herein.

After the adhesive has sufficiently dried, an inner layer of material 122 is brought into register with the outer layer and the combination is laminated in a conventional manner, such as with heat and pressure, to complete the film bag laminate 124.

The present invention may be embodied in other specific forms without departing from the spirit or essential attributes thereof and, accordingly, reference should be made to the appended claims, rather than to the foregoing specification, as indicating the scope of the invention.

What is claimed is:

1. A bag comprising:
    a wall formed from a laminate, the laminate comprising
        an inner layer,
        an outer layer, the outer layer including a fixed portion permanently attached to the inner layer, and
        a tab portion, the tab portion being of one-piece construction with the outer layer, tangentially attached to the fixed portion remote from an opening of the bag, and removably attached to the inner layer.

2. The bag of claim 1 further comprising a permanent adhesive disposed between said fixed portion of the outer layer and the inner layer.

3. The bag of claim 2 wherein said permanent adhesive is solvent based urethane.

4. The bag of claim 2 wherein the permanent adhesive is selected from the group consisting of urethane and acrylic.

5. The bag of claim 1 further comprising a non-permanent adhesive disposed between said tab portion of the outer layer and the inner layer.

6. The bag of claim 5 wherein said non-permanent adhesive is a pressure sensitive adhesive.

7. A bag laminate comprising:
    an inner layer;
    an outer layer, the outer layer including a fixed portion permanently attached to the inner layer, the outer layer also including a tab portion, the tab portion being tangentially attached to the fixed portion and removably attached to the inner layer; and
    a non-permanent pressure-sensitive adhesive is a pressure sensitive adhesive disposed between said tab portion of the outer layer and the inner layer,
    the pressure sensitive adhesive provided in zones, said zones being separated by gutters formed from a stronger adhesive, the stronger adhesive having greater affinity for the inner layer than does the pressure sensitive adhesive, said gutters being transverse to a longitudinal axis of the tab portion.

8. The bag of claim 5 wherein an adhesive free zone is provided at a tip of the tab opposite the tangential attachment of the tab and the fixed portion of the outer layer.

9. The bag of claim 5 wherein said non-permanent adhesive is acrylic pressure sensitive adhesive.

10. The bag of claim 1 wherein the inner layer comprises polyethylene.

11. The bag of claim 1 wherein the outer layer is selected from the group consisting of oriented polypropylene and polyethylene terephthalate.

12. A bag comprising:
    wall formed from a laminate having an inner layer and an outer layer,
    the outer layer having a fixed portion and a tab portion tangentially attached to the fixed portion remotely from the top edge of the bag,
    the tab portion being of one-piece construction with the wall and being capable of holding the bag closed by affixation to a rolled down portion of the bag.

13. The bag of claim 12 further comprising a permanent adhesive disposed between said fixed portion of the outer layer and the inner layer.

14. The bag of claim 13 wherein the permanent adhesive is selected from the group consisting of urethane and acrylic.

15. The bag of claim 12 further comprising a pressure sensitive adhesive disposed between said tab portion of the outer layer and the inner layer.

16. A bag comprising:

a laminate having an inner layer, an outer layer, the outer layer having a fixed portion and a tab portion,
 the tab portion capable of holding the bag closed by affixation to a rolled down portion of the bag, and
 the tab portion being tangentially attached to the fixed portion;

a permanent adhesive disposed between said fixed portion of the outer layer and the inner layer, and a pressure sensitive adhesive disposed between said tab portion of the outer layer and the inner layer,
 the pressure sensitive adhesive provided in zones, said zones being separated by gutters formed from a stronger adhesive than the pressure sensitive adhesive, said gutters being transverse to a longitudinal axis of the tab portion.

17. The bag of claim 15 wherein an adhesive free zone is provided at a tip of the tab opposite the tangential attachment of the tab and the fixed portion of the outer layer.

18. The bag of claim 15 wherein said pressure sensitive adhesive is acrylic.

19. The bag of claim 12 wherein the inner layer comprises polyethylene.

20. The bag of claim 12 wherein the outer layer is selected from the group consisting of oriented polypropylene and polyethylene terephthalate.

21. A method of sealing a bag, comprising the steps of:

providing an open bag having first and second opposed sides, the first side comprising
 an inner layer, and an outer layer affixed to the inner layer, the outer layer including
  a fixed portion and
  a tab portion of one-piece construction with the outer layer of the first side, the tab portion being tangentially attached to the fixed portion remotely from the opening of the bag and having a pressure sensitive adhesive disposed thereon;

contacting the first and second sides of the bag;

pulling the tab portion at least partially away from the inner layer;

rolling the contacted sides together down the first side of the bag, thereby forming a roll; and affixing the tab portion to the roll.

22. A bag comprising:

a wall formed from a laminate having an outer layer; and a tab cut from the outer layer of the wall of the bag, the tab being attached to the remainder of the outer layer at a base remote from an opening in the bag; and a non-permanent adhesive disposed on the tab portion for alternately affixing the tab to an inner layer of the wall and to a portion of the bag which has been rolled down to close the opening.

* * * * *